United States Patent
Platonov et al.

(10) Patent No.: US 9,129,164 B2
(45) Date of Patent: Sep. 8, 2015

(54) VEHICLE DRIVER ASSIST SYSTEM

(75) Inventors: Juri Platonov, Gruenwald (DE); Alexey Pryakhin, Munich (DE); Peter Kunath, Munich (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 776 days.

(21) Appl. No.: 12/699,230

(22) Filed: Feb. 3, 2010

(65) Prior Publication Data

US 2011/0090071 A1    Apr. 21, 2011

(30) Foreign Application Priority Data

Feb. 3, 2009    (EP) .................................... 09001443

(51) Int. Cl.
*B60Q 1/00*    (2006.01)
*G06K 9/00*    (2006.01)

(52) U.S. Cl.
CPC .................................. *G06K 9/00818* (2013.01)

(58) Field of Classification Search
CPC ............ G06K 9/00818; G08G 1/0112; G08G 1/0133; G08G 1/0141; G08G 1/096827; G08G 1/164; G06Q 30/02
See application file for complete search history.

(56) References Cited

U.S. PATENT DOCUMENTS

| | | | |
|---|---|---|---|
| 6,553,308 B1* | 4/2003 | Uhlmann et al. | 701/455 |
| 7,451,041 B2* | 11/2008 | Laumeyer et al. | 701/420 |
| 7,697,027 B2* | 4/2010 | McMahon et al. | 348/148 |
| 2002/0120397 A1* | 8/2002 | Kepler | 701/209 |
| 2004/0149504 A1* | 8/2004 | Swoboda et al. | 180/169 |
| 2006/0244830 A1 | 11/2006 | Davenport et al. | |
| 2007/0217676 A1* | 9/2007 | Grauman et al. | 382/170 |
| 2008/0239078 A1* | 10/2008 | Mohr et al. | 348/148 |
| 2008/0273757 A1 | 11/2008 | Nakamura et al. | |
| 2009/0125223 A1* | 5/2009 | Higgins | 701/200 |
| 2009/0232358 A1* | 9/2009 | Cross | 382/103 |

(Continued)

FOREIGN PATENT DOCUMENTS

| | | |
|---|---|---|
| EP | 0782118 | 7/1997 |
| EP | 1711006 | 10/2006 |
| WO | 2006/080547 | 8/2006 |

OTHER PUBLICATIONS

Zhu, Shlwei, et al.; Precise Visual Navigation Using Multi-Stereo Vision and Landmark Matching; Proc. of SPIE; vol. 6561 656108-3; 12pp.

(Continued)

*Primary Examiner* — Kerri McNally
*Assistant Examiner* — Renee Dorsey
(74) *Attorney, Agent, or Firm* — O'Shea Getz P.C.

(57) ABSTRACT

A driver assist system is provided that generates a video signal representing a vehicle environment outside a vehicle. At least one feature is extracted from the video signal. A reference is selected from a plurality of reference features stored as location attributes in a map database. The extracted feature is compared to at least one reference feature. An object in the vehicle environment is identified based on the comparison of the extracted feature and the reference feature. An indication is provided to a driver of the vehicle on the basis of the identified object. In one example, the system includes a video capturing device, an indicating device, a vehicle-based processing resource and access to a map database server. Processing tasks may be distributed among the vehicle-based processing resource and an external processing resource.

9 Claims, 4 Drawing Sheets

(56) References Cited

U.S. PATENT DOCUMENTS

| | | | |
|---|---|---|---|
| 2009/0265103 A1* | 10/2009 | Kostepen | 701/213 |
| 2010/0007523 A1* | 1/2010 | Hatav | 340/901 |
| 2010/0103040 A1* | 4/2010 | Broadbent | 342/357.14 |
| 2010/0149399 A1 | 6/2010 | Mukai et al. | |
| 2010/0329513 A1* | 12/2010 | Klefenz | 382/104 |

OTHER PUBLICATIONS

Xhang, Wei. et al.; Localization Based on Building Recognition; Proceedings of the 2005 IEEE Computer Society Conference on Computer Vision and Pattern Recognition (CVPR'05); 8 pp.

Heimes et al., "Automatic Generation of Intersection Models from Digital Maps for Vision-Based Driving on Innercity Intersections", IEEE Intelligent Vehicles Symposium 2000, Oct. 2000, pp. 498-503.

Janssen et al., Vehicle Surround Sensing Based on Information Fusion on Monocular Video and Digital Map, 2004 IEEE Intelligent Vehicles Symposium, Jun. 2004, pp. 244-249.

Se et al., "Vision-based Mobile Robot Localization and Mapping Using Scale-Invariant Features", 2001 IEEE International Conference on Robotics & Automation, May 2001, pp. 2051-2058.

Takacs, Gabriel, et al.; Outdoor Augmented Reality on Mobile Phone Using Loxel-Based Visual Feature Organization; 2008; pp. 427-434.

Susuki et al., "Extrinsic Camera Parameter Estimation from a Still Image Based on Feature Landmark Database", The Virtual Reality Society of Japan Magazine, vol. 13, No. 2, 2008, pp. 161-170.

Japanese Office Action dated Jun. 2, 2014.

\* cited by examiner

VEHICLE DRIVER ASSIST SYSTEM

RELATED APPLICATIONS

This application claims priority of European Patent Application Serial Number 09 001 443.2, filed on Feb. 3, 2009, titled METHODS AND DEVICES FOR ASSISTING A VEHICLE DRIVER, which application is incorporated in its entirety by reference in this application.

BACKGROUND

1. Field of the Invention

The invention relates to systems for assisting a driver and more particularly to systems and methods for assisting a driver of a vehicle using video.

2. Related Art

In present systems for assisting the driver of a vehicle, video signals of the vehicle environment may be recorded and processed using image processing techniques to identify objects in the vehicle environment. The identified objects may then be analyzed to generate some indication to the driver of the vehicle that would provide the driver some assistance in navigating or driving the vehicle. For example, the object may be an obstacle in the vehicle's expected path and the system would indicate the presence of the obstacle to the driver using a visual and/or audible alarm.

Video recording and image processing techniques still have some drawbacks in their use in driver assist systems. One problem is that image processing of a video signal requires significant processing resources. Driver assist systems in automobiles are therefore designed with powerful processing equipment adding cost and complexity to the automobile. In addition, even when using powerful processing resources, the process of identifying objects using image processing still suffers from an insufficient accuracy. Accordingly, a need exists for driver assist techniques and systems that provide accurate object recognition and make efficient usage of processing resources.

SUMMARY

In view of the above, a method is provided for assisting a driver of a vehicle. In one example of the method, a video signal representing a vehicle environment outside a vehicle is generated. At least one feature is extracted from the video signal. A reference is selected from a plurality of reference features stored as location attributes in a map database. The extracted feature is compared to at least one reference feature. An object in the vehicle environment is identified based on the comparison of the extracted feature and the reference feature. An indication is provided to a driver of the vehicle on the basis of the identified object.

In another example of an implementation, a system is provided for assisting a driver. The system includes a video capturing device, an indicating device, a vehicle-based processing resource and access to a map database server. Processing tasks may be distributed among the vehicle-based processing resource and an external processing resource.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Examples of driver assist systems are provided that include vehicle-based video capturing devices, such as digital cameras, which may be utilized for tasks such as driving-lane recognition or traffic-sign recognition. The driver assist systems may also include high-speed data communication between vehicle-based components and external components. Such data communication may be carried out, for example, via Internet communication channels. In examples of driver assist systems described below, data processing tasks are distributed between a vehicle-based data processing resource and an external data processing resource. The external data processing resource may be coupled to a map database. Although a wide variety of architectures may perform the necessary data processing distribution, the external data processing resource is referred to in the description that follows as a map-database server, and the vehicle-based data processing resource communicating with the map-database server is referred to as a vehicle-based client.

Figure 1:
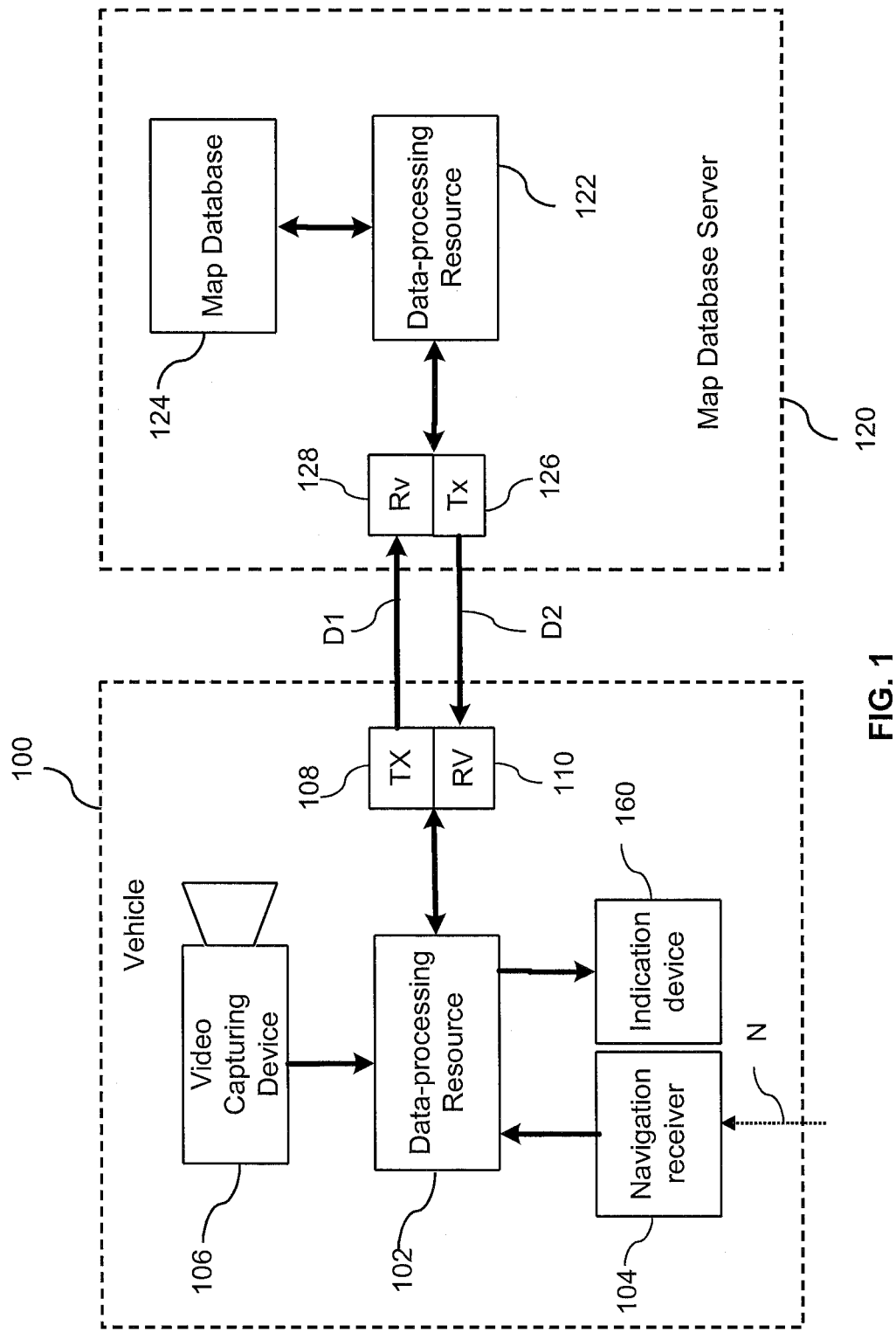
FIG. 1 is a block diagram of one example of an implementation of driver assist system.

FIG. 1 is a block diagram of an example of a driver assist system. The driver assist system is based on a distributed architecture in which one portion of the system is located in a vehicle 100 and the other portion is located outside the vehicle in a map-database server 120.

In the vehicle 100, the driver assist system includes a vehicle-based data processing resource 102, a navigation receiver 104, a video capturing device 106, a vehicle-based transmitter 108, a vehicle-based receiver 110, and an indication device 160. The navigation receiver 104 may be a GPS receiver or other type of navigation receiver, for example. The video capturing device 106 may be a digital camera, for example, which may be mounted to record the driver's available field of view. The indication device 160 may be an optical display device, an acoustic output device, an acoustic and optical output device, or some other suitable device for annunciating alarms to the driver. The above components may be part of, or associated with, a navigation system in the vehicle 100, which may be configured to direct the driver of the vehicle to a specific destination by providing suitable indications.

The navigation receiver 104 receives a navigation data signal N from a navigation satellite. The navigation signal N may be used to determine the present location of the vehicle 100, which may then be used to obtain location data of the vehicle 100 from other sources such as for example, the map database server 120.

The map database server 120 includes an external data processing resource 122 and a map database 124. The map database server 120 also includes a transmitter 126 and a receiver 128. The transmitters 108, 126 and the receivers, 110, 128 provide a link between the vehicle-based data processing resource 102 and the external data processing resource 122 for exchanging digital data in a bidirectional manner. For example, a first data signal D1 is transmitted from the vehicle to the map database server 120, and a second data signal D2 is transmitted from the map database server 120 to the vehicle 100.

The video capturing device 106 in the example in FIG. 1 is positioned within the vehicle 100 to detect the vehicle environment. In an example, the video capturing device 106 is positioned to detect images of the environment in front of the vehicle 100. The detected images may correspond substantially to the field of view available to the driver of the vehicle 100. The vehicle capturing device 106 outputs a video signal to the data processing resource 102. The video signal may be processed by the data processing resource 102 and may be displayed by the indication device 160 or by other vehicle-based display devices.

The map database 124 of the map database server 120 includes reference features associated with a specific location and stored in the map database 124 as location attributes. The reference features may also be associated with specific objects, such as a traffic sign, a point-of-interest or other suitable objects. The data processing resource 122 accesses the data stored in the map database 124 to retrieve reference features in a location-selective manner. The data processing resource 122 may also access the map database 124 to store reference features. The reference features stored in the map database 124 are precomputed reference features generated using data that may have been originally stored in the map database 124, learned from data associated with the location over time, and updated for changes over time then used as a reference for comparison with detected image data.

In operation, the driver assist system identifies an object in the image of the vehicle environment obtained from the video signal provided by the video capturing device 106. Distinctive image features may be extracted from the video signal and compared to reference image features. The reference image features may be selected from the map database 124 based on the location of the vehicle 100. The extracted features and the reference features may correspond to local image regions and their direct surrounding. Such features may be represented by a descriptor. For example, the features may be distinctive image points such as corners of buildings, strongly textured image regions, lines formed by edges of buildings, or other similar image points. In example implementations, the features may be represented as a transformation-invariant feature representation. In one example, the features may be represented using a scale-invariant feature transform ("SIFT") representation. In another example, the features may be represented by a speeded-up robust feature ("SURF") representation. SIFT-representations and SURF-representations and other transformation-invariant feature representations permit reliable matching between the extracted features and the reference features irrespective of the individual perspective used for generating the video signal. The use of a transformation-invariant feature representation also allows for efficient storage of the reference features in the map database for use in future identification processes. Transformation-invariant feature representations are used as the image descriptors in examples described here, however, other image descriptors may be used as well.

In one example of the operation of the driver assist system, the process of extracting the features from the image in the video signal captured by the video capturing device 106 is performed by the vehicle-based data processing resource 102, while the comparison of the extracted features to the selected reference features is performed by the external data processing resource 122. In this example, the first data signal D1, which is transmitted from the vehicle 100 to the map database server 120, includes location data of the vehicle 100 and the extracted reference feature. The second data signal D2, which is transmitted from the map database server 120 to the vehicle 100, is generated pursuant to the comparison performed by the external data processing resource 122 and includes object data representing characteristics of the identified object. For example, the second data signal D2 may include coordinates, dimensions or an identifier relating to the identified object. In addition or as an alternative, the second data signal D2 may include pre-processed indication data, such as video data and/or audio data to be output to the driver of the vehicle 100 without any significant further processing in the vehicle 100. The included pre-processed indication data may be used to reduce the load on the vehicle-based data processing resource 102. The identifier of the object may be a suitable designation of the object, such as for example, the name of a building, or an object type such as traffic sign or building. The object data may also include other types of useful information, such as for example, the written text on the traffic sign or other suitable information.

In another example of the operation of the driver assist system, the process of extracting features from the image in the video signal provided by the video capturing device 106 may be performed by the external data processing resource 122, thus reducing the load on the vehicle-based data processing resource 102. In this example, the vehicle-based data processing resource 102 converts the video signal into a suitable format to be transmitted to the external data processing resource 122. For example, the vehicle-based data processing resource 102 may apply a compression algorithm or selectively extract image frames of the video signal. The full video signal may also be transmitted to the external data processing resource 122. In this example of the operation of the driver assist system, the first data signal D1 includes video data derived from the video signal captured by the video capturing device 106.

In another example of the operation of the driver assist system, the process of extracting the feature from the video signal provided by the video capturing device 106 and of comparing the extracted feature to selected reference features is accomplished by the vehicle-based data processing resource 102. In this operating scenario, the first data signal D1 includes the location data of the vehicle 100. The external data processing resource 122 uses the location data to select reference features from the map database 124 based on the location data, and transmits selected reference features using the second data signal D2. The second data signal D2 may also include object data relating to the selected reference features in addition to the reference feature, or as part of another data signal. Alternatively, the object data may be retrieved via the second data signal D2 by the vehicle-based data processing resource 102 once an object has been identified by the vehicle-based data processing resource 102.

The above-described examples of the operation of the driver assist system illustrate examples of how data processing tasks may be distributed among available processing resources. The distribution of the tasks such as, for example, feature extraction and comparison to the reference features, among the processing resources of the driver assist system may be selectively implemented as different modes of operation in a single driver assist system. The selection between the different modes of operation may be based on a balance between the processing load on the vehicle-based data processing resource 102 and the processing load on the external data processing resource 122. The selection may also depend on the bandwidth available for transmitting the first and second data signals D1, D2, or on a combination of factors. For example, if a limited amount of bandwidth is available for transmitting the first and the second data signals D1 and D2, the task of extracting the features from the video signal may be accomplished by the vehicle-based data processing resource 102. If a substantial amount of bandwidth is available for transmitting the first and second data signals D1 and D2, the task of extracting the features from the video signal may be accomplished by the external data processing resource 122. The driver assist system may also be configured to operate according to only one of the above-mentioned operating scenarios.

Figure 2:
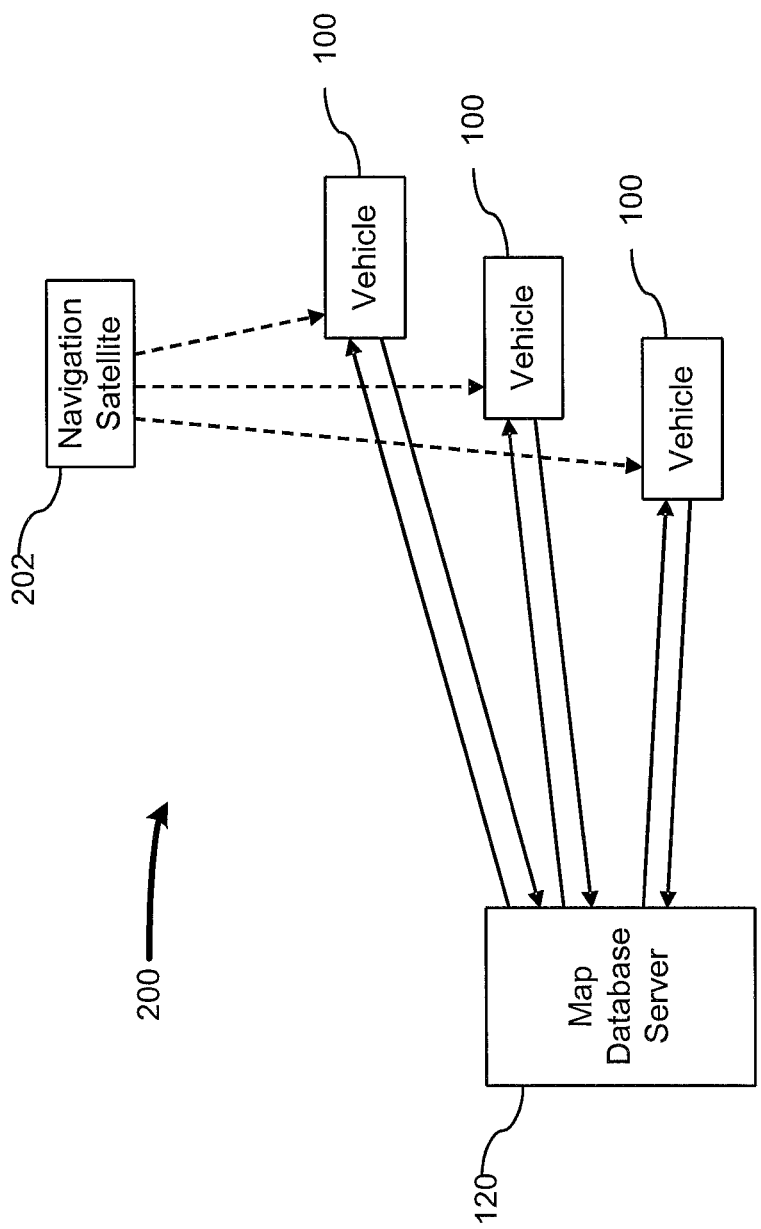
FIG. 2 is a block diagram of one example of a driver assist system implemented with a plurality of vehicles.

FIG. 2 is a block diagram of an example of a driver assist system implemented with a plurality of vehicles 100. As illustrated by solid arrows, the map database server 120 communicates with a plurality of vehicles 100. Each of the vehicles 100 receives a navigation signal (illustrated by dashed arrows) from a navigation satellite 202. The example in FIG. 2 allows the map database server 120 to provide services to more than one vehicle 100 increasing the efficiency of the map database server 120. The example shown in FIG. 2 may also include functions for correlate the data signals received from the different vehicles 100 allowing for more accurate object identification. By continuously correlating the data signals, the map database server 120 may track variations or changes in the features.

Figure 3:
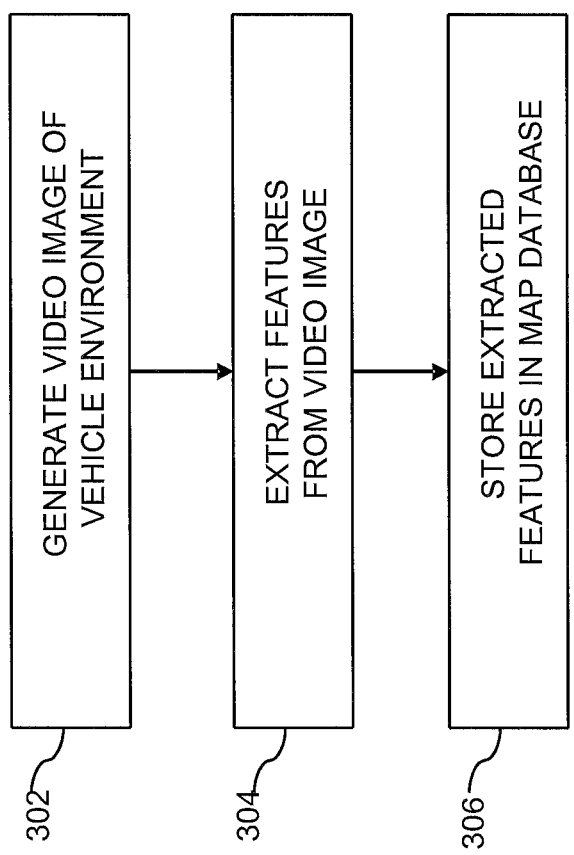
FIG. 3 is a flowchart illustrating an example method for assisting a driver.

FIG. 3 is a flowchart illustrating an example method for assisting a driver. The example illustrated in FIG. 3 illustrates an example of a learning process, which is a process for storing reference features in the map database 124. The description that follows is provided with reference to the examples of the driver assist systems described above with reference to FIGS. 1 and 2. However, those of ordinary skill in the art will understand that suitable alternative systems or components may be utilized as well.

At step 302, a video image of the vehicle environment is generated using video signals obtained from a camera, such as the video capturing device 106 in FIG. 1. Video signals may also be retrieved via a communication link from dedicated vehicles that may be utilized for obtaining the video data. At step 304, features are exacted from the video image. The feature extraction may be performed by the vehicle-based data processing resource 102, or by an external data processing resource such as the resource 122 described above with reference to FIG. 1. The task of extracting the features may be delegated to the processing resources 102, 122 based on their capabilities. For example, the external data processing resource 122 may have a higher capacity for performing such tasks.

At step 306, the extracted features are stored as location attributes in the map database 124, for example. The extracted features may be stored and associated with a specific object or semantic unit. For example, the extracted features may be associated with a point-of-interest, a specific building, or a specific traffic sign. The features may also be associated with location data. The location data corresponds to the position from which the video image with the extracted feature was detected and may be indicated in a variety of ways. For example, the location data may be indicated as a specific GPS-position, or as positions derived from a GPS-position. The reference features may then be selectively retrieved from the map database 124 on the basis of the location data. Object data relating to the reference features may also be retrieved from the map database 124.

In the example illustrated in FIG. 3, reference features may be subjected to a conditioning process or to a compression process before being stored in the map database 124. For example, artifacts due to noise or image faults that may have been part of the video signal may be removed or have their effects subdued using any suitable image processing technique. Reference features are described as being generated from video images in the above-described examples. However, reference features may also be generated from three-dimensional models of the vehicle environment. The process of generating the reference features may also be generated from video images and augmented using three-dimensional models of the vehicle environment.

Figure 4:
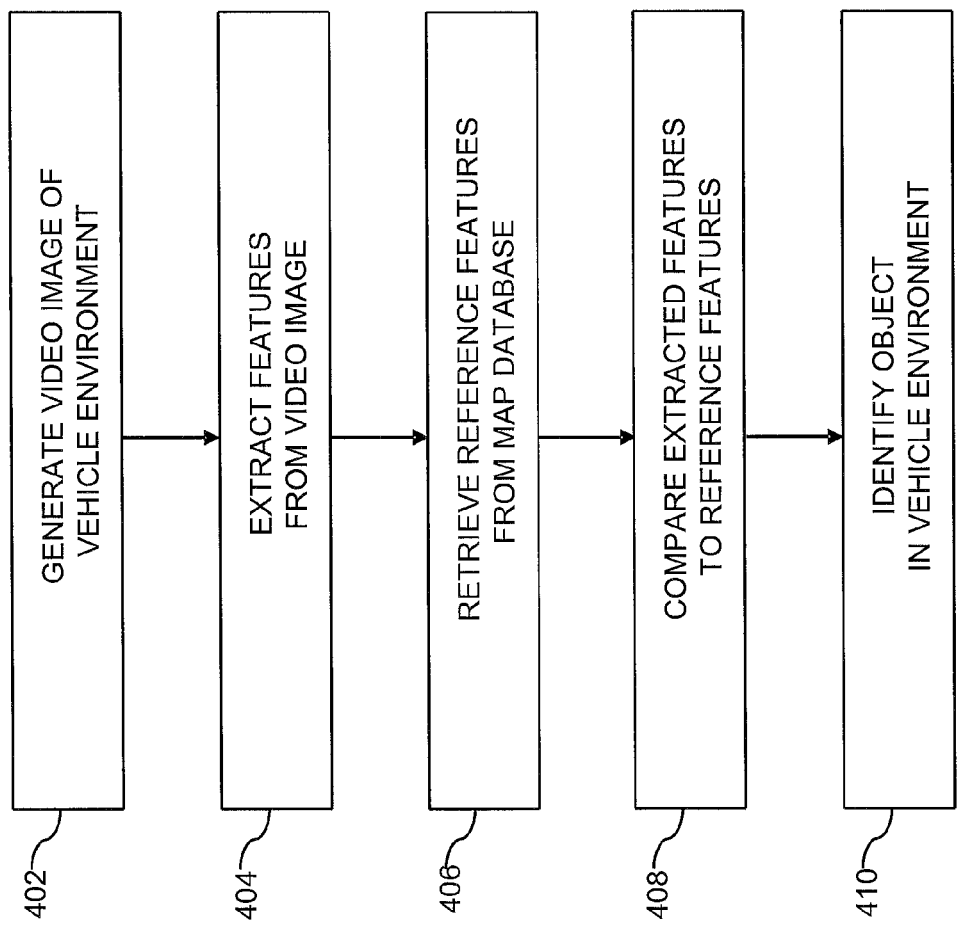
FIG. 4 is a flowchart illustrating another example method for assisting a driver.

FIG. 4 is a flowchart illustrating another example method for assisting a driver. The examples illustrated in FIG. 4 may be performed using any suitable driver assist system, but will be described in the context of the system described above with reference to FIGS. 1 and 2. At step 402 of the flowchart in FIG. 4, a video image of the vehicle environment is generated from the video signal retrieved from the video capturing device 106 of FIG. 1. At step 404, the image is processed by identifying and extracting features from the video image. Feature extraction may be performed by a vehicle-based data processing resource (such as vehicle-based processing system 102 in FIG. 1) or by an external data processing resource (such as external processing system 122 in FIG. 1).

At step 406, reference features in the vehicle environment are retrieved from the map database 124 based on the location data relating to the location of the vehicle 100. At step 408, the extracted features are compared to the reference features from the map database 124. The comparison may be performed by a vehicle-based data processing resource (such as vehicle-based processing system 102 in FIG. 1) or by an external data processing resource (such as external processing system 122 in FIG. 1). The comparison may be performed with any suitable image processing technique for comparing video images.

At step 410, an object in the vehicle environment is identified based on the comparison between the extracted features and the reference features. The identified object may then be used to provide an indication to the driver of the vehicle 100. Video data and/or audio data for providing the indication may be computed by the vehicle-based data processing resource 102 or by the external data processing resource 122.

The driver assist system and the various examples of the operation of driver assist systems may be used to improve the positioning accuracy of a navigation system of the vehicle as well as to assist the driver. For example, deviations between the location data stored in the map database 124 and the actual position of the vehicle as measured by the navigation receiver 104 may be identified and corrected. The deviations may be identified by matching the positions of the identified object with the position of the corresponding structure in the video signal.

The examples of driver assist systems described above allow for efficiently using vehicle-based data processing resources and external data processing resources to implement the object identification process. For example, the process of extracting features from the video signal may be performed by a vehicle-based data processing resource whereas the process of comparing the extracted features to the reference features is performed by an external data processing resource. In another example, the process of extracting the features from the video signal may be performed by the external data processing resource further saving vehicle-based data processing resources.

It will be understood, and is appreciated by persons skilled in the art, that one or more processes, sub-processes, or process steps described in connection with FIGS. 1-4 may be performed by hardware and/or software. If the process is performed by software, the software may reside in software memory (not shown) in a suitable electronic processing component or system such as, one or more of the functional components or modules schematically depicted in FIG. 1. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of example implementations has been presented for purposes of illustration and description. It is not exhaustive and does not limit the claimed inventions to the precise form disclosed. Modifications and variations are possible in light of the above description or may be acquired from practicing examples of the invention. The claims and their equivalents define the scope of the invention.

What is claimed is:

1. A method for assisting a driver comprising:
   generating a video signal representing a vehicle environment outside a vehicle;
   transmitting a first data signal from the vehicle to an external data processing resource, the first data signal including at least location data of the vehicle;
   transmitting a second data signal from the external data processing resource to the vehicle, the second data signal indicating at least one reference feature selected by the external data processing resource in response to the transmitted location data from a plurality of reference features which are stored as location attributes in a map database;
   comparing, by a vehicle-based data processing resource, at least one feature extracted from the video signal to the at least one reference feature;
   identifying an object in the vehicle environment on the basis of the comparison of the at least one feature extracted from the video signal and the reference feature; and
   providing an indication to a driver of the vehicle on the basis of the identified object.

2. The method of claim 1 where the second data signal includes video data or audio data to be indicated to the driver.

3. The method of claim 1 where the external data processing resource communicates with a plurality of vehicles.

4. The method of claim 3 where the external data processing resource correlates features extracted from video signals of different vehicles.

5. The method of claim 1 where the external data processing resource communicates with the vehicle via an Internet-based communication channel.

6. The method of claim 1 where the at least one feature extracted from the video signal and the reference features correspond to a transformation-invariant feature representation.

7. A driver assist device for mounting in a vehicle comprising:
   a vehicle-based video capturing device configured to generate a video signal representing a vehicle environment outside the vehicle;
   a vehicle-based transmitter for transmitting a first data signal to an external data processing resource, the first data signal indicating at least location data of the vehicle;
   a vehicle-based receiver for receiving a second data signal from the external data processing resource, the second data signal indicating at least one reference feature selected by the external data processing resource in response to the transmitted location data from a plurality of reference features which are stored as location attributes in a map database;
   a vehicle-based data processing resource configured to perform a comparison between at least one feature extracted from the video signal and the reference feature to identify an object in the vehicle environment; and
   an indication device configured to provide an indication to a driver of the vehicle on the basis of the object identified in the vehicle environment.

8. The driver assist device of claim 7 where the second data signal includes video data or audio data to be indicated to the driver.

9. The driver assist device of claim 7 where the object data include coordinates, dimensions, and/or an identifier of the identified object.

* * * * *